No. 744,171. PATENTED NOV. 17, 1903.
H. T. DAVIS & E. PERRETT.
METHOD OF SEPARATING OILY OR SIMILAR IMPURITIES FROM WATER.
APPLICATION FILED DEC. 1, 1902.
NO MODEL. 2 SHEETS—SHEET 1.
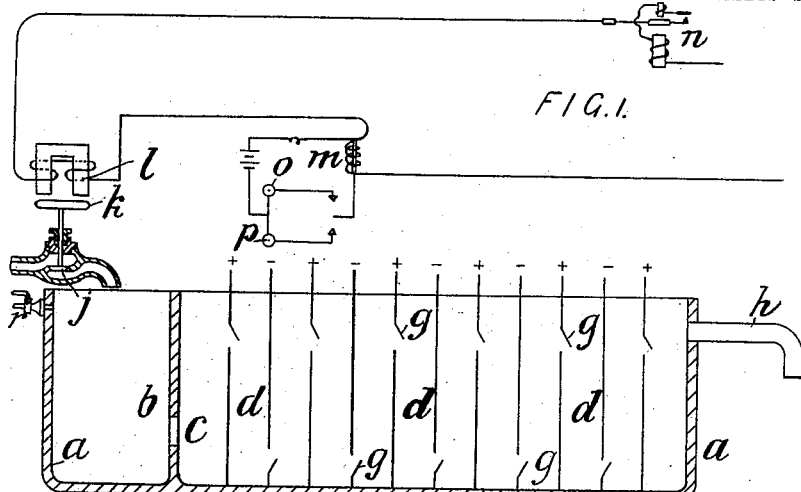
FIG. 1.
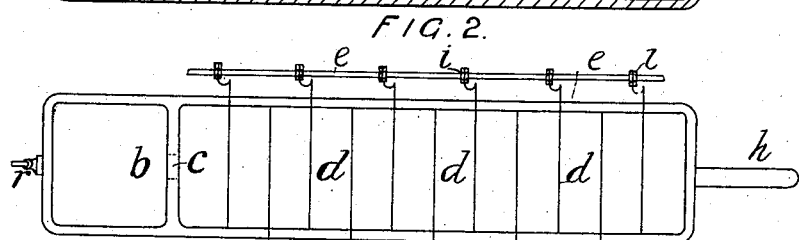
FIG. 2.
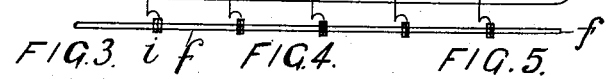
FIG. 3. FIG. 4. FIG. 5.
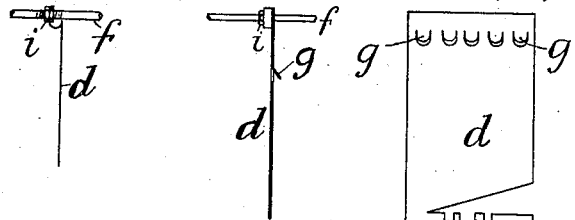
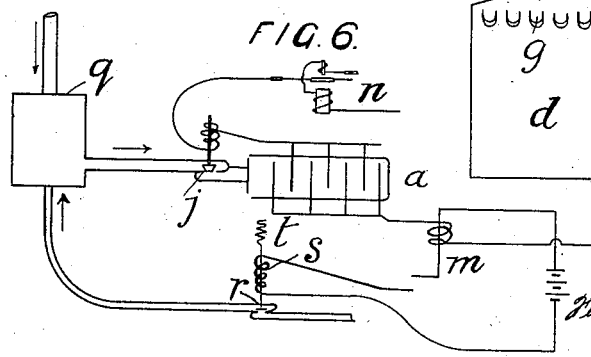
FIG. 6.
Witnesses:
Inventors:
Henry Tadwell Davis.
Ernst Perrett.
By
Atty.

No. 744,171. PATENTED NOV. 17, 1903.
H. T. DAVIS & E. PERRETT.
METHOD OF SEPARATING OILY OR SIMILAR IMPURITIES FROM WATER.
APPLICATION FILED DEC. 1, 1902.
NO MODEL. 2 SHEETS—SHEET 2.
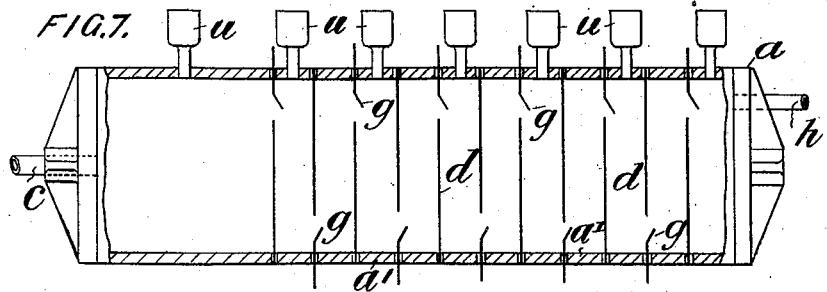
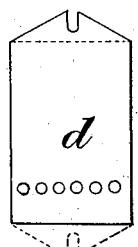
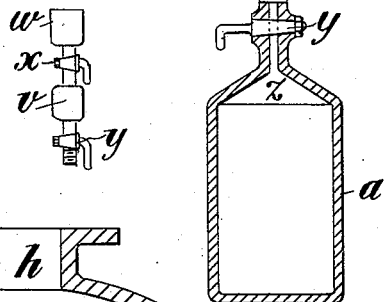
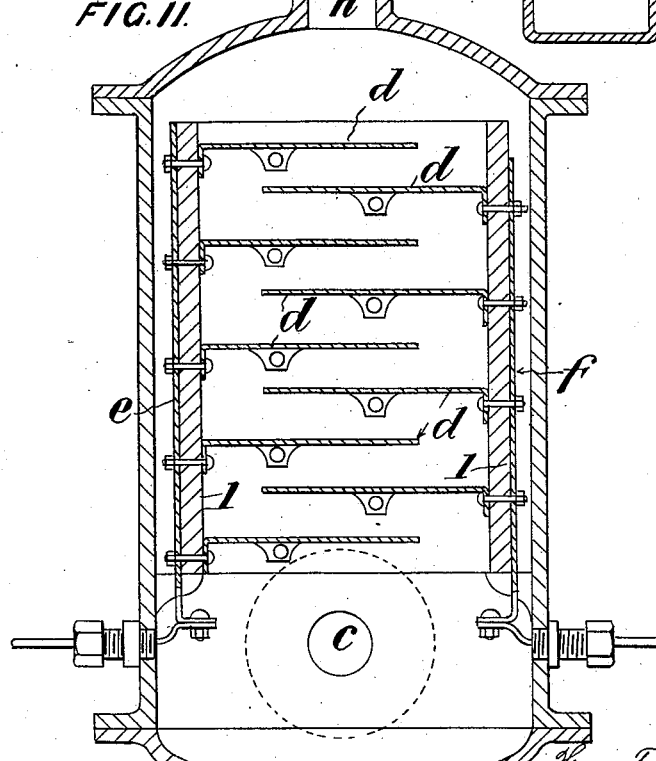

No. 744,171.

Patented November 17, 1903.

UNITED STATES PATENT OFFICE.

HENRY TADWELL DAVIS AND ERNEST PERRETT, OF LEWISHAM, ENGLAND, ASSIGNORS TO DAVIS-PERRETT, LIMITED, OF LONDON, ENGLAND.

METHOD OF SEPARATING OILY OR SIMILAR IMPURITIES FROM WATER.

SPECIFICATION forming part of Letters Patent No. 744,171, dated November 17, 1903.

Application filed December 1, 1902. Serial No. 133,501. (No specimens.)

*To all whom it may concern:*

Be it known that we, HENRY TADWELL DAVIS, engineer, of 115 Lewisham road, and ERNEST PERRETT, engineer, of 103 George Lane, Lewisham, in the county of Kent, England, have invented certain new and useful Improvements in Methods of Separating Oily or Similar Impurities from Water, of which the following is a specification.

Heretofore difficulties have been met with in separating oily and similar impurities from water contaminated therewith, and especially the oily particles contained in condense-water from steam-engines where it is desired to make such water to enter the boiler as feed-water, and that although the condense-water (the condensed exhaust-steam) has first been passed through a series of filter-cloths or the like, for it is a fact that such filtering does not anything like sufficiently remove the oily impurities.

The object of this invention is to treat oily and fatty emulsions, but more especially the condense-water from steam-engines, in such manner as to free it from the oily parts before it enters the steam-boiler as feed-water. Such condense-water is distilled water containing oil in two forms—viz., partly emulsified and partly free. The free oil particles can be easily removed by means of an ordinary filter; but the emulsified parts pass through any filter unchanged. This invention has for its object to annihilate the emulsive condition by means of electric current; but a great many experiments have proved that such electric treatment is practically impossible unless a small quantity of ordinary clean water or of a watery soda or potash solution is added to the emulsion. The reason is this, that oil in an emulsive condition is a bad conductor of electricity and hinders the passage of electric current; but the clean water (or the soda or potash solution) diffuses itself in the emulsion (the condense-water) and forms conductive paths for the electricity. The water to be purified is led into a vessel fitted with a number of suitable electrodes, which by preference have each a form or are so arranged relatively that the water is completely stirred up, and thus in all its parts exposed to the electric current. Electrodes of sheet-iron are as a rule preferred, especially on the ground of their cheapness; but other materials—such as lead, zinc, or copper—may be used and are in some cases to be preferred. When the current passes through the vessel, the infinitely-minute oily particles in emulsive condition are freed or let loose and unite simultaneously with the infinitely-small iron particles which separate from the electrodes. When thus all the oily particles have become free, (not merely those which at the outset were free, but also those which now have been freed from the emulsive part of the water,) then it is an easy matter to remove by filtration or by settling the oily parts from the water. No special filter is needed for it, because experience has proved that, for instance, an ordinary sand filter or one filled with wood shavings answers the purpose. Filter-presses are of special advantage on board ship or where, generally speaking, space is of more value than first cost. The filtered water is pure distilled water quite freed from oily or iron particles and can be used as feed-water and even as drinking-water, being tasteless. Analyses have shown that the oily parts are not oxidized in any appreciable degree, and the oil can be recovered from the iron-colored scum which forms on the surface of the water in the vessel, from the filter, or from the settling-tank. The current direction should be periodically reversed in order to insure an equal consumption of the electrodes. The water may be heated by a steam-coil or otherwise. Practically it is found that the hotter the water the more quickly it passes through the filter.

In the accompanying drawings are illustrated various ways of carrying out the invention.

Figure 1 is a sectional elevation, and Fig. 2 a plan, of an electrolytic tank. The upper part of Fig. 1 shows diagrammatically a device for the automatic regulation of the inlet of the water, together with a signaling device which in some cases may be considered advisable or useful, though in ordinary practice regulation by hand has been found sufficient. Fig. 3 is a detail plan view of an electrode and its connection, and Fig. 4 a side view of same. Fig. 5 illustrates a mode of forming two plates from one sheet. Fig. 6 is a diagram illustrating the means for controlling the inlet of the oily and of the conducting liquids. Fig. 7 is a longitudinal sectional elevation of the vessel containing the electrodes. Fig. 8 is a front view of an electrode. Fig. 9 shows a cup and tap device for collecting the oily scum. Fig. 10 is a cross-section of another form of vessel containing electrodes. Fig. 11 is a vertical cross-section of another form of such vessel.

$a$ is a tank, which may be of stoneware, slate, wood, iron, with non-conductive lining, or of other suitable material. The tank may, as here shown, be formed or provided with a separate inlet-compartment $b$, into which the oily water is admitted. By the tap $r$ is admitted the small quantity of ordinary clean water (or carbonate-of-soda or of potash solution) as required for adjusting the conductivity of the oily water to the current required.

$c$ is an opening or openings for admitting the water to the tank proper, which is fitted with a number of sheet-metal (by preference iron) electrodes $d$. As will be seen from the separate side views, Figs. 3 and 4, these electrodes are formed with openings alternately at top and bottom for the purpose of causing the water to take a circuitous path while being subjected to the electric current. The conductors $e$ and $f$ connect the plates alternately. The passages through the electrodes are here, as an example, formed by tongues $g$, partly punched out and bent, so as to direct the flow of the water.

$h$ is the outlet to the filter or settling-tank.

The plates may, as shown in Fig. 4, be connected to the conductors by means of nuts $i$ back and front. Fig. 5 shows how two plates may be stamped out of one sheet.

The valve $j$ is provided with an armature $k$, which is attracted by the electromagnet (or solenoid) $l$. The latter is in circuit with an armature $m$, provided with adjustable maximum and minimum contacts and with an automatic maximum and minimum cut-out $n$.

$o$ and $p$ are glow-lamps of different colors, which show a light, one or the other, as the current rises above or falls below a predetermined limit. In connection therewith a bell may or may not be used for calling attention.

The wire from $n$ leads to the dynamo and the wire from $m$ leads to the one set of electrodes, while the other set is connected with the other pole of the dynamo. When the circuit is closed, the current passes through $n$, $l$, and $m$ and through the vessel $a$ back to the dynamo. The valve will then be opened, so that the condense-water can flow into the vessel. If the current should become too great, one of the lamps will be lighted. If this warning is not heeded, the circuit is broken by $n$; but if the current should become too small the other lamp will be lighted, and the circuit will also be broken by $n$. In both cases the magnet $l$ will close the valve $j$ and stop the entry of condense-water.

Fig. 6 shows diagrammatically the same arrangement as above described, with the addition of a device for regulating automatically the supply of the clean water or soda solution to the oily water. $q$ is a mixing-tank into which the condense-water flows and into which the clean water is admitted at the bottom by the valve $r$, which is regulated by the solenoid $s$, with spring $t$ and suitable wire connections to a small battery or other source of current. The ammeter $m$ is for indicating the current and for closing the circuit when the valve $r$ is controlled by a separate battery, as shown; but the valves $j$ and $r$ may, if preferred, be placed over one another and be controlled by the same magnet or solenoid, thus dispensing with the separate battery.

Fig. 7 is a sectional elevation of another form of tank, and Fig. 8 an end view of an electrode $d$. The tank is here, as an example suitable for use on board ship, made of a number of sections $a'$, with intermediate electrodes $d$ and interposed joint-packings. The conductors $e$ and $f$ are in this case at top and bottom, (or might be at the sides.) $c$ is the inlet and $h$ the outlet for the water under treatment. On the top of the tank are provided small cups $u$, wherein the oily scum can rise and be periodically removed. When the apparatus is worked under pressure, the cups are made in the form $v$, Fig. 9—that is to say, provided with an upper cup $w$ and lower and upper taps $x$ and $y$, which taps are alternately opened and shut to let out the oily scum—or the tank may be made in the form shown in cross-sectional view, Fig. 10, provided with a space or pocket $z$ at the top, in which the oily scum can collect and be periodically removed by opening the cock $y$.

Fig. 11 is a vertical section through a tank $a$, with horizontal electrodes $d$, specially suitable for working under pressure or head of water. The plates $d$ are attached to and within an insulating-lining $l$, which may be of stoneware. $e$ and $f$ are the conductors, $c$ the inlet for the water, and $h$ the outlet.

The distance between the electrodes will be varied according to the voltage of the current employed and according to the surface of electrode exposed. The tank itself may in some cases form one electrode.

As regards the filtering it is found that ordinary sand makes excellent filtering material; but on board ship, where the filter would be in motion, we prefer to use filter-cloth or other suitable filtering devices.

Where—as, for instance, in the case of a winding-engine—the supply of oily water from the condenser is at intervals only, a settling-tank can be used as a reservoir or hot-well, from which the purified feed-water can be pumped into the boiler.

It is impossible to lay down any general rule for the amount of conducting liquid to be added to the condense-water, as individual cases and circumstances differ. Neither is it at all necessary, as the experience of a few days or hours will furnish the required information. In one instance where the condense-water from engines of two thousand indicated horse-power is purified the condense-water-supply pipe is two inches in diameter, while the clean-water-supply pipe is one-fourth of an inch in diameter. As regards the amount and character of current in the same example the following has been found suitable, viz: voltage one hundred and fifty and the current from twenty-five to thirty amperes, corresponding to about five or six horse-power. Actual experiments have, however, shown that even two hundred and twenty volts in one direction and thirty volts in the other have proved effective.

Having thus described our said invention, what we claim as new therein, and desire to secure by Letters Patent, is—

1. The method of separating oily and similar particles from water containing the same in emulsive condition, which consists in passing an electric current through the emulsified water for the purpose of causing the oily particles therein to unite with metallic particles and float on the surface of the liquid and separating the supernatant product, substantially as described.

2. The method of separating oily and similar particles from water containing the same in emulsive condition, which consists in mixing with the liquid a suitable electrically-conductive liquid, and causing the oily particles to unite with a suitable metal and become disengaged from said water by electrolyzing the mixture between metallic electrodes, substantially as described.

3. The method of separating oily and similar particles from water containing the same in emulsive condition, which consists in passing an electric current through the emulsified water for the purpose of causing the oily particles to unite with iron, substantially as described.

4. The method of separating oily and similar particles from water containing the same in emulsive condition, which consists in mixing therewith a suitable conductive liquid and electrolyzing the mixture between iron electrodes, thereby causing iron to unite with the oil and removing the supernatant product thus formed, substantially as described.

5. The method of separating oily and similar particles from water containing same in an emulsive condition, consisting in adding thereto as required conducting liquid and subjecting the water to the action of electric current between metallic electrodes.

6. The method of separating oily and similar particles from water containing same in an emulsive condition consisting in adding thereto as required conducting liquid, automatically controlling the admission of said water by means of electric current and subjecting the water to the action of electric current between metallic electrodes.

7. The method of separating oily and similar particles from water containing same in an emulsive condition consisting in adding thereto as required conducting liquid, and subjecting the water to the action of electric current between metallic electrodes and controlling the admission of the said liquid by electric current.

8. The method of separating oily and similar particles from water containing same in an emulsive condition consisting in adding thereto as required conducting liquid, subjecting the water to the action of electric current between metallic electrodes, and then removing the separated oily particles from the water treated.

9. The method of separating oily and similar particles from water containing same in an emulsive condition consisting in adding thereto as required conducting liquid, subjecting the water to the action of electric current between metallic electrodes, and then removing the separated oily particles from the water treated by means of filtration.

In testimony whereof we have signed our names to this specification in the presence of two subscribing witnesses.

HENRY TADWELL DAVIS.
ERNEST PERRETT.

Witnesses:
WALTER J. SKERTEN,
V. JENSEN.